United States Patent
Redmond et al.

(10) Patent No.: US 7,227,817 B1
(45) Date of Patent: Jun. 5, 2007

(54) LOW PROFILE OPTICAL HEAD

(75) Inventors: Ian Redmond, Boulder, CO (US);
Bernard Bell, Lafayette, CO (US);
David L. Blankenbeckler, Longmont, CO (US); Michael F. Braitberg, Boulder, CO (US); Robert D. Freeman, Erie, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/457,104

(22) Filed: Dec. 7, 1999

(51) Int. Cl.
*G11B 7/00* (2006.01)

(52) U.S. Cl. .................. 369/44.19; 369/44.14; 369/44.23; 369/112.01; 369/119

(58) Field of Classification Search ............ 369/44.19, 369/44.14, 44.23, 112.01, 44.11, 44.12, 44.17, 369/44.18, 44.21, 44.28, 112.04, 112.27, 369/119
See application file for complete search history.

(56) References Cited

U.S. PATENT DOCUMENTS

| | | | |
|---|---|---|---|
| 3,530,441 A | 9/1970 | Ovshinsky | 340/173 |
| 3,868,651 A | 2/1975 | Ovshinsky | 340/173 |
| 3,983,542 A | 9/1976 | Ovshinsky | 340/173 |
| 4,205,387 A | 5/1980 | Ovshinsky et al. | 364/900 |
| 4,542,495 A | 9/1985 | Ziegler et al. | 369/273 |
| 4,571,718 A | 2/1986 | Cahill et al. | 369/291 |
| 4,577,289 A | 3/1986 | Comerford et al. | 364/900 |
| 4,647,944 A | 3/1987 | Gravesteijn et al. | 346/1.1 |
| 4,710,899 A | 12/1987 | Young et al. | 365/113 |
| 4,872,156 A | 10/1989 | Steenbergen et al. | 369/275 |
| 4,945,530 A | 7/1990 | Sandell et al. | 369/291 |
| 4,953,209 A | 8/1990 | Ryder, Sr. et al. | 380/23 |
| 4,960,680 A | 10/1990 | Pan et al. | 430/346 |
| 5,060,106 A | 10/1991 | Davis et al. | 360/133 |
| 5,063,558 A | 11/1991 | Takahashi | 369/291 |

(Continued)

FOREIGN PATENT DOCUMENTS

EP       0 886 352 A1     12/1998

(Continued)

OTHER PUBLICATIONS

Brown, et al.; "Anamorphic Lenses For Laser Diode Circularization", in Laser Diodes and LEDs In Industrial, Measurement, Imaging and Sensors Applications II: Testing, Packaging and Reliabilioty of Semiconductor Lasers V, Preceedings of SPIE, vol. 3945 (2000).

*Primary Examiner*—Muhammad Edun
(74) *Attorney, Agent, or Firm*—Jonathan W. Hallman; MacPherson Kwok Chen & Heid LLP

(57) ABSTRACT

An optical head of a type useable in a optical disk reader/writer is provided. The optical head has a low profile, e.g., in a vertical direction parallel to the disk spin axis, such as less than about 5 mm preferably less than about 3 mm. Substantially all components of the optical system, including a laser source, objective lens, intervening optics and photo detector are provided in the optical head and mounted in a fixed position with respect to one another. Substantially all optical components of the optical head are moved as a unit, e.g., during tracking and/or focusing. Preferably, the optical head is fabricated using wafer scale and/or stacking technologies, e.g., stacking substantially planar components to achieve the final optical head configuration.

58 Claims, 8 Drawing Sheets

U.S. PATENT DOCUMENTS

| | | |
|---|---|---|
| 5,073,889 A | 12/1991 | Rayner ........................ 369/291 |
| 5,077,726 A | 12/1991 | Dodds et al. ................ 369/291 |
| 5,103,476 A | 4/1992 | Waite et al. .................... 380/4 |
| 5,128,099 A | 7/1992 | Strand et al. ................ 420/579 |
| 5,146,552 A | 9/1992 | Cassorla et al. ............. 395/145 |
| 5,247,575 A | 9/1993 | Sprague et al. ................. 380/9 |
| 5,271,978 A | 12/1993 | Vazan et al. ................... 428/64 |
| 5,272,693 A | 12/1993 | Fujisawa ..................... 369/291 |
| 5,280,467 A | 1/1994 | Wanger et al. ........... 369/275.5 |
| 5,286,338 A | 2/1994 | Feldblum et al. ........... 156/643 |
| 5,323,380 A | 6/1994 | Oda et al. ................ 369/275.1 |
| 5,331,627 A | 7/1994 | Childers et al. ............. 369/291 |
| 5,339,091 A | 8/1994 | Yamazaki et al. ........... 345/104 |
| 5,379,266 A | 1/1995 | Russell ....................... 365/234 |
| 5,436,871 A | 7/1995 | Russell ....................... 365/234 |
| 5,447,768 A | 9/1995 | Takahashi .................. 428/66.6 |
| 5,465,238 A | 11/1995 | Russell ....................... 365/234 |
| 5,475,399 A | 12/1995 | Borsuk ....................... 345/130 |
| 5,511,035 A | 4/1996 | Russell ....................... 365/234 |
| 5,511,058 A | 4/1996 | Visel et al. .................. 369/103 |
| 5,532,920 A | 7/1996 | Hartrick et al. .......... 364/419.1 |
| 5,534,385 A | 7/1996 | Spahn ................... 430/270.13 |
| 5,541,888 A | 7/1996 | Russell ....................... 365/234 |
| 5,555,304 A | 9/1996 | Hasebe et al. .................. 380/4 |
| 5,563,947 A | 10/1996 | Kikinis ........................... 380/4 |
| 5,581,540 A | 12/1996 | Dang ......................... 369/291 |
| 5,587,994 A | 12/1996 | Nagaura et al. ............. 369/291 |
| 5,591,501 A | 1/1997 | Ovshinsky et al. ........ 428/64.1 |
| 5,610,902 A | 3/1997 | Childers et al. ............. 369/289 |
| 5,619,488 A | 4/1997 | Ota et al. .................... 369/112 |
| 5,629,980 A | 5/1997 | Stefik et al. .................... 380/4 |
| 5,638,241 A | 6/1997 | Sonderegger ............... 360/133 |
| 5,654,856 A | 8/1997 | Akiyama et al. ........... 360/133 |
| 5,696,714 A | 12/1997 | Russell ....................... 365/106 |
| 5,703,951 A | 12/1997 | Dolphin ......................... 380/25 |
| 5,719,850 A | 2/1998 | Yoshioka et al. ........... 369/283 |
| 5,719,972 A | 2/1998 | Caron et al. ................... 385/18 |
| 5,726,971 A | 3/1998 | Wanger et al. .............. 369/291 |
| 5,732,058 A | 3/1998 | Iwamura et al. ........... 369/75.2 |
| 5,737,300 A | 4/1998 | Ota et al. .................... 369/112 |
| 5,748,609 A | 5/1998 | Tanaka ....................... 369/291 |
| 5,757,584 A | 5/1998 | Schick ..................... 360/99.08 |
| 5,757,908 A | 5/1998 | Cooper et al. .................. 380/4 |
| 5,764,603 A | 6/1998 | Glaser-Inbari ........... 369/44.23 |
| 5,765,152 A | 6/1998 | Erickson ......................... 707/9 |
| 5,768,241 A | 6/1998 | Kanazawa et al. ......... 369/77.2 |
| 5,793,584 A | 8/1998 | Knight et al. ............... 360/133 |
| 5,793,742 A | 8/1998 | Sandell et al. .............. 369/291 |
| 5,796,697 A | 8/1998 | Masaki et al. ............. 369/75.2 |
| 5,799,157 A | 8/1998 | Escallon ..................... 395/227 |
| 5,808,986 A | 9/1998 | Jewell et al. ............. 369/44.37 |
| 5,812,519 A | 9/1998 | Kawamura et al. ...... 369/275.1 |
| 5,828,482 A | 10/1998 | Jain ............................. 359/211 |
| 5,831,967 A | 11/1998 | Otsuka et al. ............... 369/291 |
| 5,831,968 A | 11/1998 | Tanaka ....................... 369/291 |
| 5,838,653 A | 11/1998 | Fan et al. ................. 369/275.1 |
| 5,850,384 A | 12/1998 | Ohmori et al. .............. 369/291 |
| 5,857,021 A | 1/1999 | Kataoka et al. ................. 380/4 |
| 5,859,829 A | 1/1999 | Otsuka et al. .............. 369/77.2 |
| 5,859,831 A | 1/1999 | Naito et al. ................. 369/291 |
| 5,870,364 A | 2/1999 | Raczynski .................... 369/47 |
| 5,876,823 A | 3/1999 | Nagashima ................ 428/64.1 |
| 5,881,038 A | 3/1999 | Oshima et al. ................ 369/59 |
| 5,886,979 A | 3/1999 | Moribe et al. ............ 369/275.3 |
| 5,892,825 A | 4/1999 | Mages et al. ................... 380/3 |
| 5,897,324 A | 4/1999 | Tan ............................. 434/317 |
| 5,912,786 A | 6/1999 | Nicklos et al. ........... 360/99.09 |
| 5,930,074 A | 7/1999 | Nicklos ................... 360/99.06 |
| 5,930,215 A | 7/1999 | Fite et al. ...................... 369/58 |
| 5,946,282 A | 8/1999 | Hirono et al. ............... 369/112 |
| 5,949,601 A | 9/1999 | Braithwaite et al. .......... 360/60 |
| 5,963,532 A | 10/1999 | Hajjar ......................... 369/112 |
| 6,076,256 A * | 6/2000 | Drake et al. ................... 29/825 |
| 6,128,134 A | 10/2000 | Feldman et al. ............. 359/565 |
| 6,466,525 B1 * | 10/2002 | Gage et al. ............... 369/44.19 |

FOREIGN PATENT DOCUMENTS

| | | |
|---|---|---|
| JP | 11176744 | 7/1999 |
| WO | WO 00/33121 | 6/2000 |

* cited by examiner

LOW PROFILE OPTICAL HEAD

Cross reference is made to U.S. patent application No.: 09/315,398 entitled Removable Optical Storage Device and System, filed May 20, 1999, and to U.S. patent application No.: 60/140,633 entitled Combination Mastered and Writeable Medium and Use in Electronic Book Internet Appliance, filed Jun. 23, 1999.

The present invention is related to an optical head, e.g., for use in reading from and writing to an optical disk and in particular to an optical head where substantially all optical components from the laser source to the objective are maintained in a fixed spatial relationship.

BACKGROUND INFORMATION

One of the important factors affecting design of an optical system (such as a system for an optical disk reader/writer, typically including a laser or other optical source, lenses, reflectors and other components) is the size of the optical system, both in terms of the mass, volume and/or dimensions and in terms of the size and shape of the light as it reaches the optical disk (the spot size and quality). Although a wide variety of systems have been used or proposed, typical previous systems have used optical components that were sufficiently large and/or massive that functions such as focus and/or tracking were performed by moving only some components of the system, such as moving the objective lens (e.g. for focus) relative to the laser or other light source. Without wishing to be bound by any theory, it is believed that the relatively large size of components was related to the spot size, which in turn was substantially dictated by designs in which the data layer of a disk was significantly spaced from the physical surface of the disk (so that the optical path passed through a substantial distance of the disk, such as about 0.6 mm or more before reaching the data layer).

Regardless of the cause behind providing for relative movement between optical components, such an approach, while perhaps useful for accommodating relatively larger or massive components, presents certain disadvantages, including the relatively large form factors required and the cost associated with establishing and maintaining optical alignment between components which must be made moveable with respect to one another. Such alignment often involves manual and/or individual alignment or adjustment procedures which can undesirably increase manufacturing or fabrication costs for a reader/writer, as well as contributing to costs of design, maintenance, repair and the like. Accordingly, it would be useful to provide an optical head method, system and apparatus which can reduce or eliminate the need for relative movement between optical components, during normal operation and/or can reduce or eliminate at least some alignment procedures, e.g., during reader/writer manufacturing.

Many early optical disks and other optical storage systems provided relatively large-format reader/writer devices including, for example, devices for use in connection with 12 inch (or larger) diameter disks. As optical storage technologies have developed, however, there has been an increasing attention to providing feasible and practical systems which are of relatively smaller size. For some applications, e.g., for use in personal electronic devices (PEDs), e.g. as described in U.S. patent application Ser. No. 09/315, 398 for Removable Optical Storage Device and System (incorporated herein by reference), a device for reading and/or writing optical disks is described having a relatively small form factor such as about 10.5 mm height, 50 mm width and 40 mm depth. Generally, a practical reader/writer device must accommodate numerous items within its form factor including the media, media cartridge (if any), media spin motor, power supply and/or conditioning, signal processing, focus, tracking or other servo electronics, in addition to the components associated or affecting the laser or light beam optics. Accordingly, in order to facilitate a relatively small form-factor, it would be advantageous to provide an optical head apparatus, system and method which can occupy a relatively small volume. In addition to total volume considerations, constraints imposed by a desired form factor and/or the need to accommodate other reader/writer components can make it advantageous to provide an optical head apparatus system and method which is relatively small in certain dimensions such as having a relatively small vertical profile or dimensional requirement (with "vertical" referring to a direction parallel to the optical disk spin axis), although reduction of requirements in other dimensions (such as a longitudinal dimension parallel to an optical arm axis and/or a lateral dimension perpendicular to the longitudinal axis) may also be of importance. Provision of a low vertical profile configuration can be specially problematic since, for at least some optical designs (including, e.g. finite conjugate designs), a minimum optical path may be required or advisable (although the read/write beam generally must reach the optical disk substantially normal to the plane of the disk). Accordingly, it would be useful to provide an optical head apparatus system and method which can reduce dimensional requirements such as reducing vertical dimension requirements, e.g., in the case of a PED to less than about 12 mm, preferably less than about 5 mm and more preferably less than about 3 mm.

A number of optical reader/writer devices, including, for example, relatively large devices such as audio compact disk (CD) players in a typical home stereo system, present relatively little concern with power management or power budgets (typically having access to AC line level power or the like). As a result, in many such systems, it is feasible to provide an optical design which is relatively inefficient of optical power (such as by substantially overfilling lenses and the like, e.g. to accommodate noncircularity of laser sources). In contrast, devices such as those described in this application Ser. No. 09/315,398, supra and or 60/140,633 intended to be lightweight and portable, generally must operate with a limited power budget (and also have a more limited ability to dissipate heat, compared with larger systems). Accordingly, it would be useful to provide a optical head apparatus system and method which can achieve the desired optical quality (e.g. accommodating noncircularity or other optical features) while avoiding undue energy inefficiency and/or unnecessary heat generation (e.g. arising from substantial overfilling of lenses or optical components or otherwise "spilling" optical energy).

SUMMARY OF THE INVENTION

The present invention provides a practical and feasible system in which substantially all components of the optical head from the laser or other light source to the objective move together as a unit (e.g. for focus and/or tracking), i.e. in which substantially each optical component of the optical head is in a fixed location with respect to other components.

In one embodiment, the optical head is based on a wafer-scale fabrication approach. Preferably, a silicon or similar wafer having electronics formed therein, in the normal fashion, has optical components stacked or otherwise positioned thereon, preferably at least some components being placed prior to slicing the wafer, to form the optical components of the optical head. In one embodiment, a first mirror/spacer level is positioned on the wafer and one or more levels of optics (generally proportioned similar to the proportions of the "chip" after wafer slicing) are positioned on the top of the spacers. In one embodiment, alignment of some or all optical layers above the spacer is performed while the laser source (preferably mounted on the wafer) is emitting laser light, and using the emitted laser light to assist in positioning or alignment.

In one embodiment, the read/write beam travels through one of the optics layers in a direction substantially parallel to the plane of the disk. Providing a configuration in which a substantial portion of the optical path is parallel to the plane of the disk assists in providing a relatively low vertical profile. By providing a system which can use wafer-scale fabrication and which can be fabricated by stacking discrete components such as spacers, optical components and the like, it is possible to construct a small, high precision, low weight, low profile and/or small spot-size optical head at relatively low fabrication costs.

In one aspect an optical head of a type useable in a optical disk reader/writer is provided. The optical head has a low profile, e.g., in a vertical direction parallel to the disk spin axis, such as less than about 5 mm preferably less than about 3 mm. Substantially all components of the optical system, including a laser source, objective lens, intervening optics and photo detector are provided in the optical head and mounted in a fixed position with respect to one another. Substantially all optical components of the optical head are moved as a unit, e.g., during tracking and/or focusing. Preferably, the optical head is fabricated using wafer scale and/or stacking technologies, e.g., stacking substantially planar components to achieve the final optical head configuration.

DETAILED DESCRIPTION OF THE PREFERRED EMBODIMENT

Figure 1:
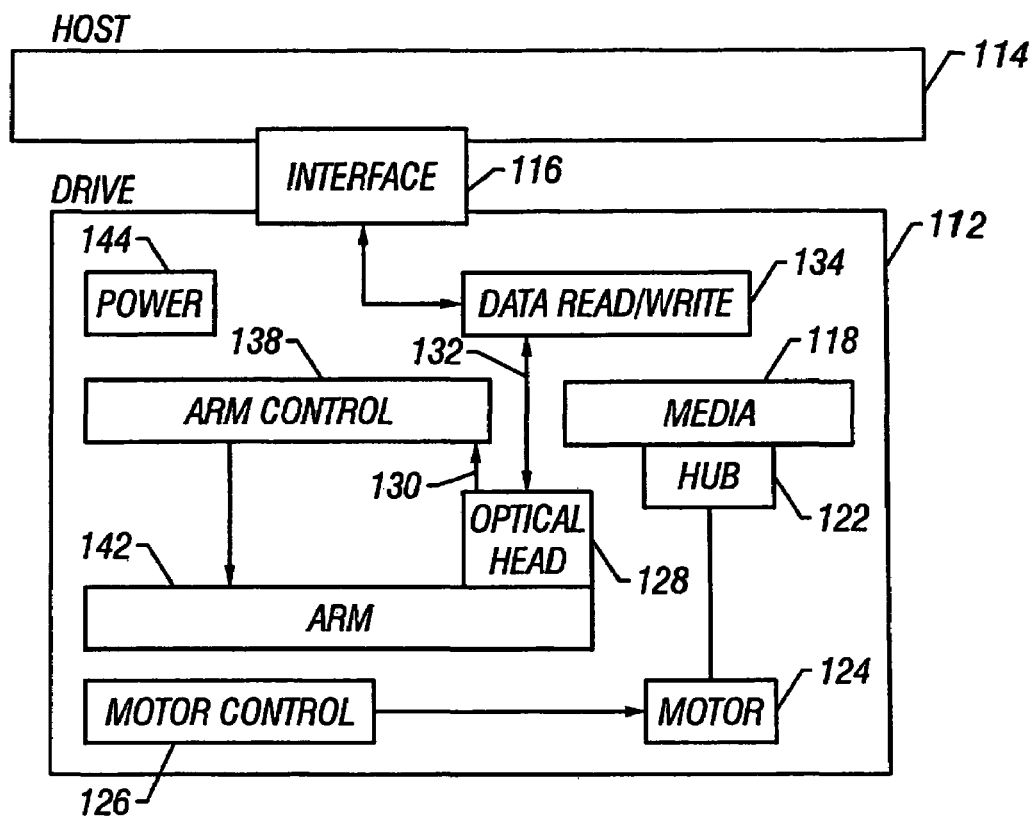
FIG. 1 is a simplified block diagram of a reader/writer drive device coupled to a host device of a type that can be used in connection with embodiments of the present invention.

The present invention can be used in the context of a number of drives and drive configurations, including as described in U.S. patent application Ser. No. 09/315,398, supra. In the configuration depicted in FIG. 1 a reader/writer drive device 112 is coupled to a host device 114 (which may be, for example, a personal electronic device (PED) such as a music and/or video player, a camera, and electronic book or other text reader and the like) by an interface 116. In the embodiment depicted in FIG. 1, the drive 112 holds or receives optical media, typically an optical disk 118 which has a hub 122 for coupling or centering with respect to a disk spin motor 124 under control of a motor control 126. In one embodiment, the media 118 is a first surface media, e.g. as described in U.S. patent application Ser. No. 09/315,398 supra., incorporated herein by reference. Bits on the media 118 are read or written using an optical head 128 (e.g. as described more thoroughly below) which provides data or signals 132 to a data read/write electronics 134, e.g., for passing to the host 114 via the interface 116. The optical head 128, in one embodiment, includes substantially all components or devices which control or affect the laser or optical beam along its entire path from generation to arrival and/or reflection from the media 118 and detection, including the laser or other light source, lenses, gratings, holograms, wave plates, mirrors, beam splitters and other refractive, reflective, diffractive or other optics for affecting the light beam or controlling, photo diode or other light detectors and the like. Preferably, some or all electronics for controlling and/or modulating the laser and/or conditioning, digitizing and/or processing detection signals are included in the optical head. Information or signals obtained using the optical head 128 are also provided 136 to an arm control electronics 138 which moves or controls an optical arm 142, e.g. for tracking and/or focus. A power source or conditioner 144 provides power for electronics and/or motors or actuators. Various configurations of a drive 112 can have other components, not depicted in FIG. 1, such as mechanical components for receiving and/or ejecting the media 118 and/or media cartridges, content control electronics, microprocessors or other processors, data storage memory devices, data encryption/decryption electronics, and/or other components as will be understood by those of skill in the art after understanding the present disclosure.

The size, mass, volume, shape and/or vertical, longitudinal and/or lateral dimensions or requirements and/or cost of the optical head 128 are of significance to the overall feasibility and cost of a drive device 112, especially when the configuration of the drive device 112 places constraints on the position, size, shape or cost of other components of the drive 112, and particularly when it is desired to substantially accommodate the drive 112 in a certain form factor, e.g., as described in U.S. patent application Ser. No. 09/315, 398, supra.

Figure 2:
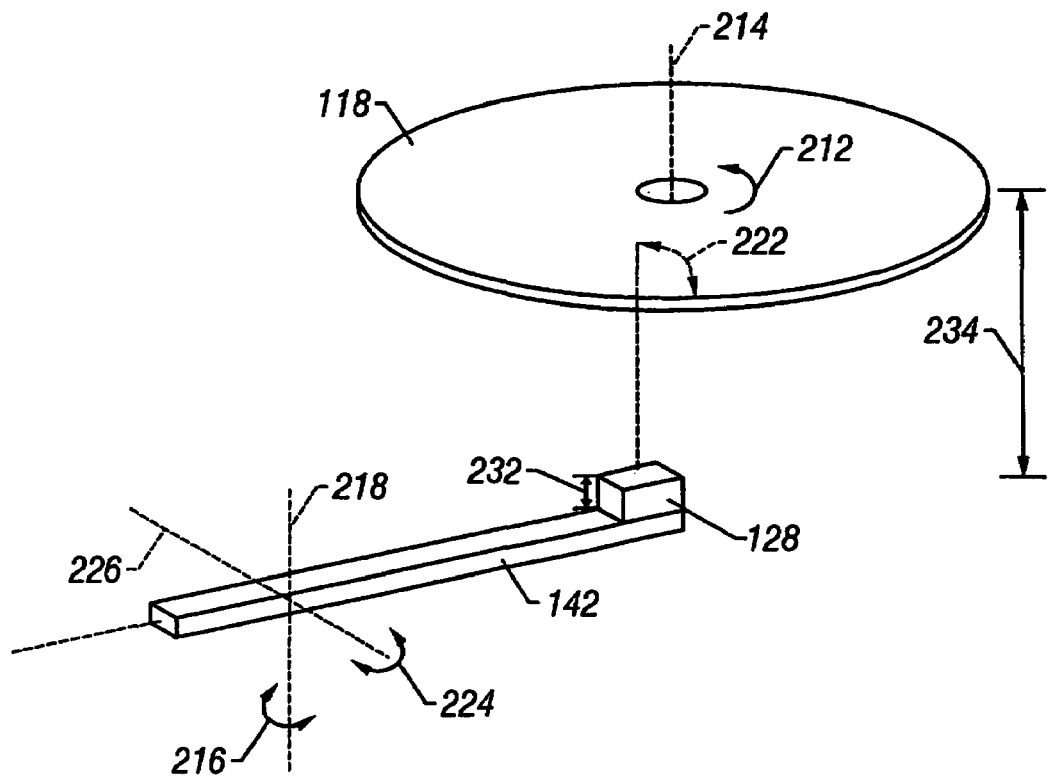
FIG. 2 is a perspective schematic view of an optical arm and optical disk according to an embodiment of the present invention.

FIG. 2 illustrates in generalized or schematic form, a positional relationship of an optical head 128 and arm 142 with respect to media 118 according to one embodiment of the present invention. In the embodiment of FIG. 2, the optical head 128 is mounted in a fixed position with respect to the optical arm 142. As described more thoroughly below, preferably, all components of the optical head 128 are in a constant or fixed position with respect to one another, i.e. there is substantially no relative movement of any optical component of the optical head 128 with respect to any other component of the optical head. Instead, in the depicted embodiment, to achieve desired alignment with data on the media 118 (i.e. tracking) and/or focus, the entire optical head 128 is moved, as a unit, with respect to the media 118.

In a preferred embodiment, the optical path is configured such that the optical path length (measured along the optical axis, following any folding of the optical path) from the source to the objective is substantially greater than the distance from the objective to the data surface of the medium. In one embodiment, the ratio of the source-to-objective path length to the objective-to-data surface path length is at least about 5. As used herein "objective" or "objective lens" refers to the component which focuses light onto the recording layer or recording surface of the medium. Although this is typically a lens, i.e. a refractive optical component, "objective" or "objective lens" as used herein can also encompass other optical components, such as gratings or other diffractive components, holographic components and the like. Although typically the last or ultimate optical component along the optical path before the light reaches the medium, "objective" or "objective lens" as used herein can also encompass items which may not be the last optical component before reaching the medium. The optical path length from the objective to the data surface is a function of numerous factors including the numerical aperture of the lens, the distance (if any) from the disk surface to the data surface and the smallest safe spacing between the optical head and the disk surface (the "working distance"). In one embodiment, it is desired to provide an optical path length from the source to the objective greater than about 2.5 mm, preferably greater than about 4 mm, and even more preferably greater than about 4.5 mm. One embodiment of the present invention involves achieving such a source-to-objective path length while providing a low-profile device, preferably such that a reader/writer device can be accommodated in a form factor with a (vertical) profile less than about 10.5 mm.

In the depicted embodiment, media 118 rotates 212 about a spin axis 214 which defines what will be referred to herein as the vertical direction. Spinning of the disk 212 provides for alignment of the light beam with (successive) circumferential positions on the disk 118. Alignment with desired radial positions (tracking) is provided by moving the optical head 128 in a direction having a radial component, preferably by rotating 216 the optical arm 142 about a substantially vertical axis 218 so that the position at which the light beam reaches the disk 118 defines an arc 222 extending throughout a predetermined radial range of the disk 118. In the depicted embodiment, to provide focusing, the entire optical head 128 is moved, as a unit, along a path having a vertical component such as by pivoting 224 the arm 142 about a substantially horizontal axis 226. Although the illustration of FIG. 2 is not to scale, it suffices to illustrate that the overall vertical dimension for accommodating the component depicted in FIG. 2 will be affected by the vertical profile or height 232 of the optical head 128, as well as other dimensions such as the spacing 234 to the media 118 and the like.

Figure 11:
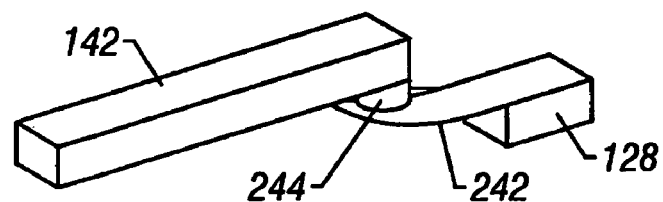
FIG. 11 is a partial perspective view depicting an optical arm and a relatively movable optics head, according to an embodiment of the present invention.

FIG. 2 depicts an embodiment in which not only the optics components of the optics head 128 move together, but in which the optics head moves with (is substantially rigidly coupled to) the optics arm 142. It is also possible to provide embodiments in which, while components of the optics head (preferably including at least the light source and the objective) are non-movable with respect to each other, the optics head may be movable with respect to the arm. For example, in the embodiment of FIG. 11, the optics head 128 may be coupled to the arm 142 by a movable or flexible, preferably resilient, leaf member 242. The leaf member 242 may include all or part of a flexible printed circuit (flex-circuit) device e.g. for providing signals to and from the optics head 128. A number of flex circuit materials or devices can be used. One example is a flex circuit using a substrate including a polyimide material such as that sold under the trade name Kapton®, available from E. I. du Pont de Nemours and Company of Wilmington, Del., with one or more copper traces or regions and/or one or more electronic components formed or mounted thereon). Preferably, movement of the head 128 with respect to the arm 142 can be positively controlled, such as by using a voice coil 244 or other electromagnetic or electronic device for moving the head toward or away from the arm 142.

Figure 3:
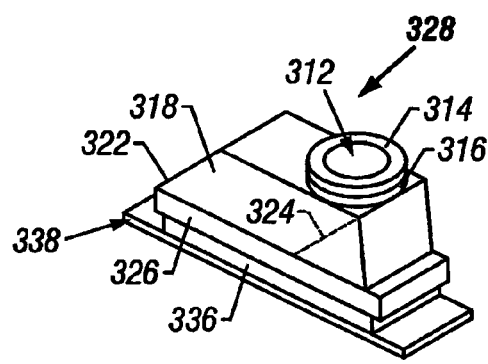
FIG. 3 is a perspective view of an optical head according to an embodiment of the present invention.
Figure 4:
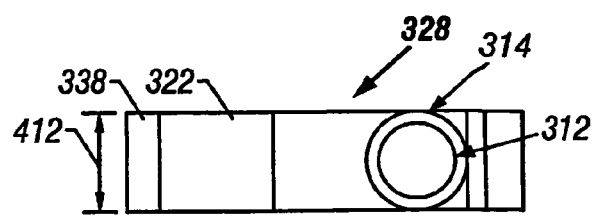
FIG. 4 is a top plan view of the optical head of FIG. 3.
Figure 5:
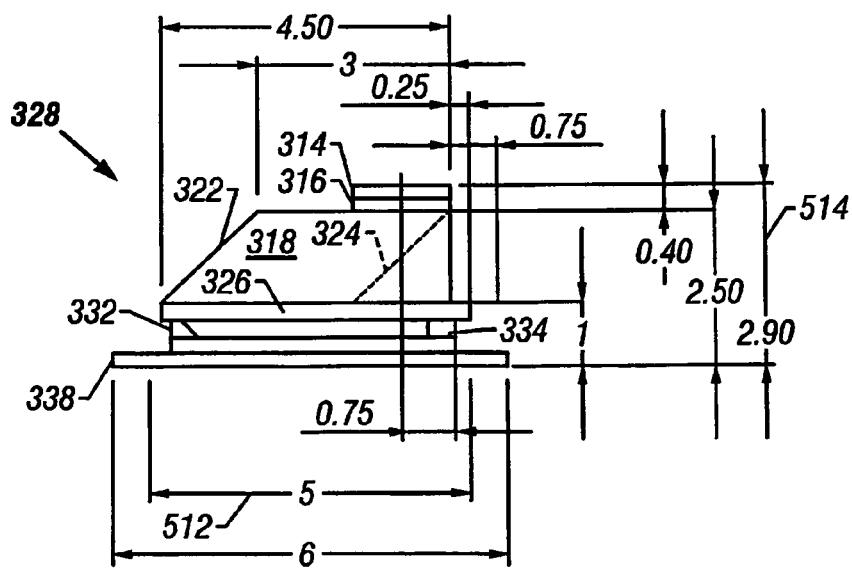
FIG. 5 is a side elevational view of an optical head of FIG. 3.

FIGS. 3–5 depict an optical head 328 according to one embodiment of the present invention. In the depicted embodiment, an objective lens 312 is positioned by a lens mount 314 over a quarter wave plate 316. The lens mount can be formed of a number of materials including steel, glass, or silicon. The quarter wave plate can be formed of a number of materials, including mica. In some embodiments the functionality of a quarter wave plate can be provided by a coating. Below the quarter wave plate 316 is a optical block, referred to herein as a periscope block 318. The periscope 318 is substantially transparent, at least at the wavelength of the laser light, and defines a first angled (preferably 45° angle with respect to vertical) surface 322 acting substantially as a mirror, as described more thoroughly below. Preferably the 45° surface 322 will be coated with a substantially reflective coating such as aluminum or reflective chrome coatings. The periscope 318, in the depicted embodiment, also includes a interior polarization beam splitter surface 324 also preferably at about 45° (with respect to vertical) which is substantially reflective (i.e. acts substantially as a mirror) for light with a first polarization and substantially transmissive for light with a second polarization. The periscope block can be made from a number of material, including, e.g., fused silica or $SF_2$ (flint glass).

Below the periscope 318 is an optical die 326. The optical die 326 is provided with lenses, gratings, holograms, or other optical components or devices, as described more thoroughly below.

The optical die 326 is coupled by spacer blocks 332, 334 to an underlying sub-mount 336 (preferably sliced from a silicon or similar wafer, as described more thoroughly below). In the depicted embodiment, the sub-mount 336 is positioned on a printed circuit board 338.

The light path has its origin in the laser diode 612 mounted, with respect to the sub-mount 336, e.g., using a laser mount 614. In one embodiment, the laser beam is not collimated but follows a (slowly) diverging configuration substantially from the laser source to the objective lens to provide a finite conjugate system. In this configuration the beam forming optics are provided principally for fully or partially circularizing the light and/or fully or partially correcting astigmatism. One potential advantage of a finite conjugate (point-to-point imaging system) is that the substantial demagnification provides an effective reduction or elimination of the astigmatism that arises from the laser. However, circularizing lens 352a may create sufficient astigmatism that a second lens or other optics 352b may be advisable for correcting astigmatism. It is also possible to position lenses or other optics on the surface of the sub-mount 336 between the laser and the mirror block 332, e.g. for circularizing or other optics purposes. In one embodiment lenses or similar optics 352a, b along the optical path are configured to at least partially correct for angular errors in the mounting (and thus the beam direction) of the laser diode.

In the depicted embodiment, the laser diode is a side-emitting laser diode and the horizontal laser beam 616 output by the laser diode 612 is reflected to a vertical beam by a 45° surface 618 positioned with respect to the sub-mount 338 preferably by being incorporated as a surfaces of one of the spacers 332. In one embodiment, a portion of the emitted laser beam is reflected back (e.g. from the optics block 326) for purposes of monitoring and controlling laser power output.

Figure 16:
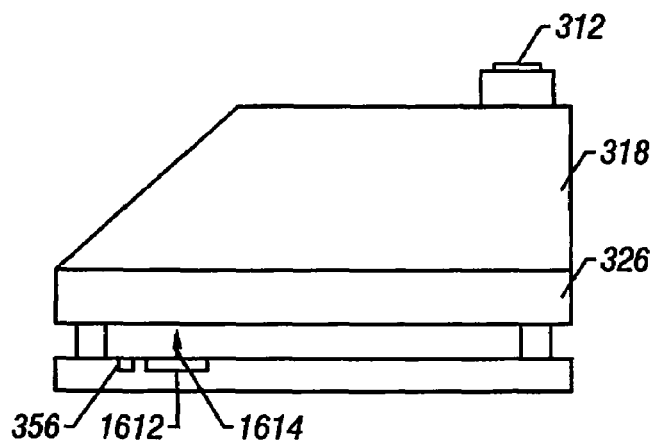
FIG. 16 is a side elevational view of components of an optical head which uses a VCSEL, according to an embodiment of the present invention.

As depicted in FIG. 16, the use of surface 618 for turning the beam from a horizontal beam 616 to a vertical beam could be eliminated from the design by providing a laser which is not side-emitting, such as a vertical cavity, surface-emitting laser (VCSEL) 1612 (e.g. as described in U.S. patent application Ser. No. 09/315,398, supra) which can be configured or positioned to emit substantially in a vertical direction 1614. VCSEL's are also useful because of the substantial circularity of the beam and reduction or elimination of astigmatism.

Figure 8:
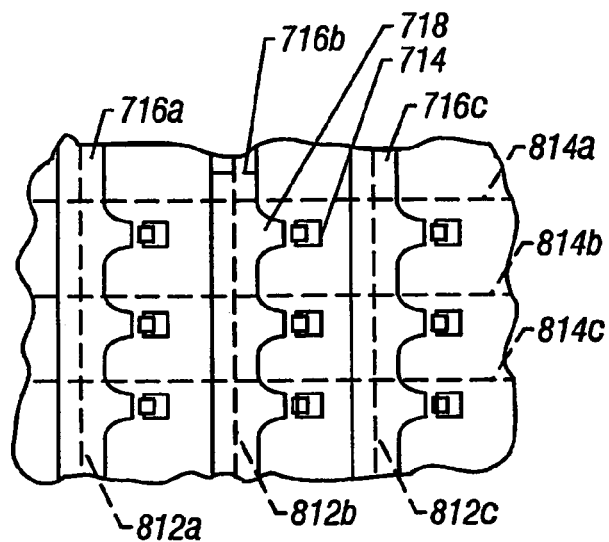
FIG. 8 is a top plan view of a portion of a wafer with mounted spacer components.
Figure 7:
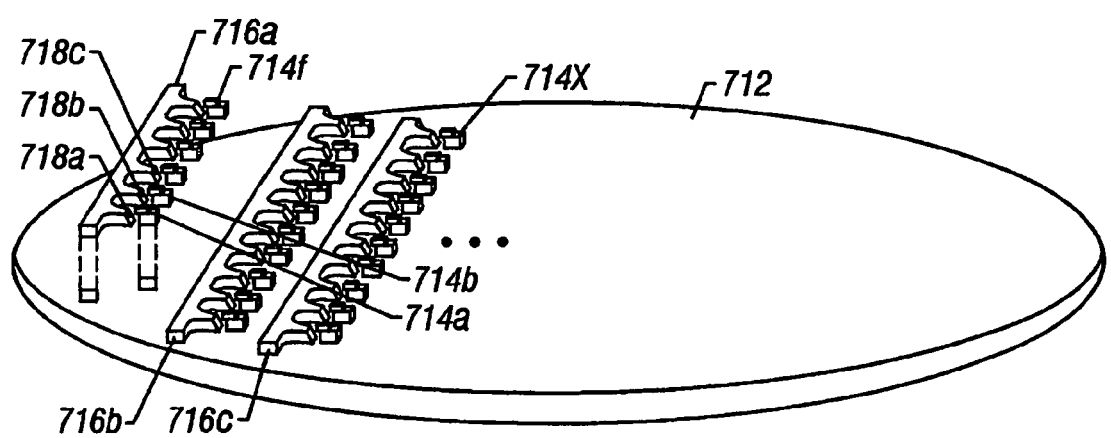
FIG. 7 is a perspective view partially exploded of a wafer and partially mounted spacer components according to an embodiment of the present invention.
Figure 9:
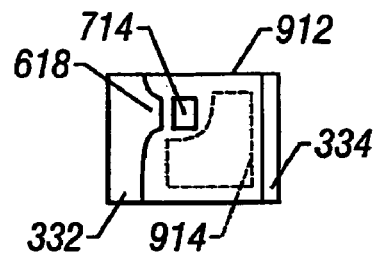
FIG. 9 is a top plan view of one resultant wafer section following wafer cutting.

As depicted in FIG. 7, in one embodiment the sub-mount 336 is formed from a small ("sliced") portion of a larger silicon (or other) wafer 712 (FIG. 7), with the wafer being formed, using typical wafer fabrication techniques, preferably including a plurality of other electronic components forming portions of some or all of the drive circuitry 112 such as a high frequency modulator, pre-amp, laser diode driver, photodetector and associated circuitry, power or control circuitry, tracking or focus servo, data read/write electronics and the like. A wafer 712 formed with a plurality of silicon "chip" regions (which will be separated, e.g., by sawing or slicing, as described below) then has mounted on it, e.g. using optically guided pick and place technologies or the like, a plurality of laser diodes and mounts 714a through 714x and a plurality of spacer bars with integrated mirrors 716a,b,c. Each spacer bar 716 contain a plurality of 45° mirror surfaces (718a, 718b, 718c, etc.). The laser diode 714 and mirror 718 of the spacer bar 716 are positioned on the wafer 712 with respect to the electronics thereon so as to provide for coupling of the laser to laser power, control or similar circuitry and to provide for substantial alignment of the output beam of the laser with a corresponding mirror 718. After the desired components are positioned on the wafer 712, the wafer is sliced or sawed, e.g., along a plurality of lines (depicted, in FIG. 8, in phantom, 812a,b,c, 814a,b,c). As shown in FIG. 8, preferably, the saw lines 812abc are positioned so that each resultant chip has left and right spacers 332, 334, resulting from right and left (respectively) portions of sawed spacer bars 716. In the resultant configuration depicted in FIG. 9, each chip 912 has mounted, thereon, in a desired configuration, or alignment, a laser diode 714, a turning mirror 618 and spacers 332 334, preferably with sufficient area 914 on the chip 912 remaining to accommodate various electronic components formed as part of the wafer 712.

Although a number of shapes and sizes of devices can be used according to the present invention, in one embodiment, the sub-mount 336 has a length 512 of about 5 mm and a lateral dimension 412 of about 1.5 mm.

The optical die 326 which is to be positioned above the sub-mount 336 (and spaced therefrom by the spacers 332, 334) in the depicted embodiment includes a plurality of beam shaping optics 352 and servo optics 354. In one embodiment, the beam shaping optics 352a, b are provided as (or perform functions substantially similar to those of) toric or cylindrical lenses, e.g., for fully or partially circularizing the laser beam, correcting astigmatism and the like. Preferably, the optics are configured to substantially avoid an overfilling technique so as to avoid spilling or wasting optical energy.

The optics 352a,b, 354 can be lenses or similar refractive optics, gratings or holograms or other diffractive optics and the like. In general, refractive optics are preferred, when otherwise feasible, because of the relatively higher sensitivity of diffractive optics to wavelength. Preferably the optical die 326 is formed of a glass or plastic (e.g. polycarbonate, acrylic and the like) with the optics formed therein in predefined positions prior to assembly. Glass is preferred, when otherwise feasible, because it is relatively insensitive to temperature and water absorption (or other chemical attack and can be joined to other components using higher temperature techniques such as solder reflow. Optics may be formed in the optical die by etching techniques including providing approximate stepped shapes, continuous shapes, segmented or "telescoped" lenses, Fresnel lenses, and the like.

In one embodiment, the optical die 326 is placed in the desired operable position with the aid of light from the laser diode 612. In this embodiment, the laser diode is connected to at least power and control circuitry prior to mounting of the optical die 326 and the silicon sub-mount 336 can be provided with power sufficient to provide the laser light output from the laser diode 612 and, optionally, to detect signals at a photo-diode or similar detector array. In one embodiment, positioning equipment for placing and mounting the optical die with respect to the spacers 332 334 involves monitoring characteristics of light transmitted through one or both of the beam shaping optics 352a,b and/or servo optics 354 as the optical die 326 is moved and positioned. Preferably, the optical die 326 is mounted with respect to the spacers 332, 334 using well known techniques such as solder reflow. By using a procedure in which the optical die is positioned while light is being emitted from the laser (or other light source), and in which the position and/or focus or other characteristics of the light is used to guide optical-die-positioning equipment (preferably in a substantially automatic fashion, such as by using detected light to define a servo or control signal for the positioning equipment), the positioning of the optical die can at least partially compensate for various inaccuracies in the position of the laser (or other light source).

It is also possible to use an active alignment technique (i.e. using light from the laser to help in component placement, during fabrication) to at least partially compensate for inaccuracies in the relative position of the laser (or other light source) with respect to the photodector(s) 356. In one embodiment, after the optical die is positioned and fixed, the periscope block, preferably with the objective already mounted thereon, is positioned using active alignment. In one embodiment, a mirror is positioned near the objective (e.g. to mimic the reflection from the optical disk) and the periscope block is moved until the reflected light forms a desired or closest-fit pattern with respect to the photodetector(s). In at least one embodiment, it is believed that moving the periscope block is most feasible for positioning the reflected beam in a lateral direction (i.e. a direction perpendicular to the longitudinal axis of the optical arm). Accordingly, it is believed useful, in at least some embodiments, to select a type or configuration of photodetector(s) which is relatively insensitive to inaccuracies of beam placement in the longitudinal direction. In that way, the active alignment technique can be used to position the periscope block so as to provide the greatest accuracy of beam placement in the lateral direction, where the photodector(s) are most sensitive to inaccuracies.

Although it is possible, in some configurations, to position the optical die 326 prior to positioning of other components (such as the periscope 318, lens 312 and the like), in another embodiment, it is also possible to separately assemble some or all of the periscope 318 quarter wave plate 316, and/or lens 312 and the like to the optical die 326 prior to mounting the optical die 326 with respect to the spacers 332, 334. Regardless of the order in which the various components are aligned and mounted, embodiments of the present invention are believed to provide substantial benefits arising from employing wafer scale assembly techniques and/or multiple layer (stacking) assembly techniques to fabricate the optical head. By providing a relatively inexpensive and practical fashion for assembling an optical head to achieve a desired (and substantially static) alignment between components, the assembly of the entire drive 112 is simplified since critical alignment has already been performed during assembly of the optical head and relatively less critical or higher-tolerant assembly of the head to the arm 142 can be achieved, e.g., in a drive manufacturing or assembly plant at relatively low cost.

The periscope 318 is mounted, e.g., using solder reflux, adhesive or similar assembly techniques, to position the periscope mirror 322 in the desired position with respect to the optical die beam shaping optics 352*ab* so as to reflect the beam in a horizontal direction 358, i.e., substantially parallel to the data surface of the disk 362. The polarization beam splitter 324 is, in the depicted embodiment, substantially parallel to the periscope mirror 322 (i.e. substantially at about a 45° angle with respect to vertical) and may be formed by a coating (PBS coating) placed on a surface of a first block of the periscope 318 preferably with the coated surface mating with a surface of a end block 364 of the periscope 318. The PBS 324 is selected or applied in such a fashion that the PBS will be substantially reflective with respect to the polarization of laser light as it arrives at the PBS ("first polarization"). Those of skill in the art will understand how to select or control polarization or polarization beam splitters in this fashion.

Accordingly, the PBS reflects the laser beam in a vertically upward direction (i.e. towards the disk 362, 366). The beam travels through the quarter wave plate 316 and thence through an objective lens 312 aligned with the quarter wavelength by the lens mount 314. The objective lens 312 is configured to substantially provide the desired spot size (focus) with respect to the read/write surface of the (preferably first surface) disk 362.

Although a number of sizes and shapes of devices can be used in accordance with embodiments of the present invention, in the depicted device, the height 514 from the printed circuit board 338 to the lens 314 is about 2.9 mm. In one embodiment, the distance from the objective lens 312 to the surface of the disk 362 (defining the working distance for the optical system) is about 0.3 mm.

After reaching the disk 362, and depending on the portion of the disk illuminated and whether a data bit is present or absent at that position, light reflected from the disk 362 passes vertically downward to the objective lens 312 and quarter wave plate 316. At this point (e.g. because of passage twice through the quarter wave plate 316), polarization of the reflected light as it reaches the PBS coating is different from the first polarization and the PBS coating 324 is configured to allow substantially all of the reflected light to pass through the PBS coating and continue vertically downward, through the servo optics 354 and to the photo detector array 356. A number of types of photo detector array can be used including quadrant detectors, φ detectors and the like, and the type of servo optics 354 will be selected corresponding to the type of detector being used, as will be understood by those of skill in the art after understanding the present disclosure.

Figure 6:
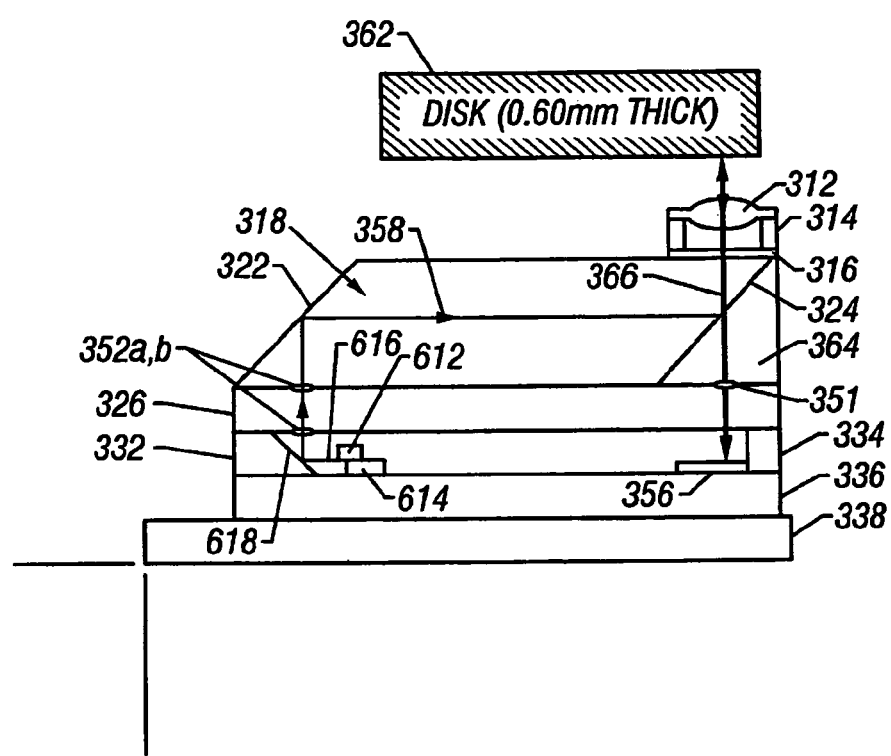
FIG. 6 is a cross sectional view through an optical head and a portion of an adjacent disk according to an embodiment of the present invention.
Figure 12:
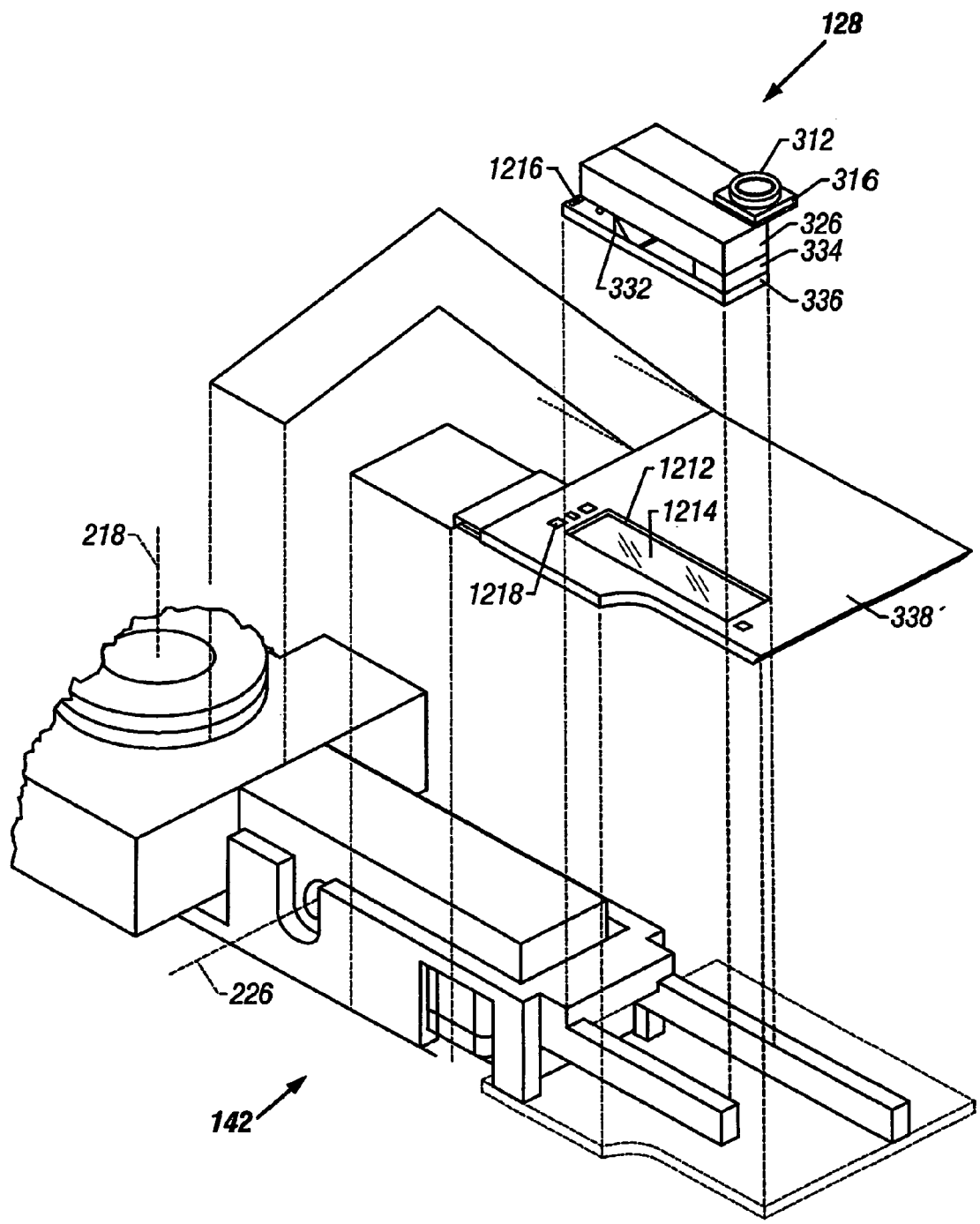
FIG. 12 is a partial exploded perspective view of an optics arm and optics head according to an embodiment of the present invention.

FIG. 12 illustrates one example of a manner of providing for communication of electrical signals to and from the optical head 128. Although the embodiment of FIG. 6 provided for the submount 336 to be positioned with respect to a printed circuit board 338, in the embodiment of FIG. 12, the submount 336 is accommodated in a cut-out 1212 formed in a flex circuit (e.g. a Kapton(®-copper flex circuit) 338'. The flex circuit 338' is preferably electronically coupled to the optics head 318 such as by forming wire bonds between optics head bonding pads 1216 and flex circuit bonding pads 1218. The flex circuit 338' can be physically coupled e.g. by an epoxy or other adhesive, such as that sold under the tradename Epo-Tek H70E-2, available from Epoxy Technology, Inc. of Billerica, Mass. Some or all of the flex circuit or other components may be coated or encapsulated, e.g. for protection. The flex circuit 338' preferably contains some or all electronics used for control and/or signal processing for the optics head 128. Other manners of providing for electrical communications to and from the optics head will be understood by those of skill in the art after understanding the present disclosure.

One of the significant factors in design of devices, according to embodiments of the present invention, relates to thermal management. Many laser diodes or other light sources can be significant heat sources. In addition, many electrical or electronic components, such as power supplies or conditioners, resistors, diodes, and other items, can add to the total heat load. It would not be unexpected to use a laser device having a power output near 200 milliwatts. Elevated temperature can damage, or degrade performance, of electronic components and/or media, both in a drive, and in a PED or other device which incorporates a drive. Lasers and other components may have performance characteristics which change, sometimes radically, as a function of temperature, and it may be difficult or expensive to adequately compensate for such changes. Further, products which perceptibly generate heat may have reduced commercial appeal. Previous electronic or electro-optical devices commonly used relatively large, heavy or power-consuming components, such as large and/or heavy heat sinks, fans and the like. The present invention, however, is preferably a low-profile (or otherwise small) device and is especially suited to (although not necessarily limited to) use in connection with PEDs or other small, lightweight, low-power devices. Accordingly, it is preferred to configure the optical head in a fashion to avoid concentrations or quantities of heat an/or to avoid elevated temperatures which might harm equipment or components or which might degrade performance. Preferably, in at least one embodiment, at least a portion of the underside of the flex circuit 338' (preferably with the portion 1214 extending over some or all of the cut-out region 1212) has a coating or layer of a thermally conductive material, such as copper, e.g. to act as a heat sink or heat dissipator. In one embodiment, the submount 614 (if present) is formed of a substantially thermally conductive material, such as aluminum nitride. The submount has a relatively large surface area (e.g. compared to the footprint of the laser diode 612 and/or mount 614) to effectively spread the heat, generated by the laser, over a relatively large surface area, avoiding concentrations of heat and undue (locally) elevated temperatures.

Figure 13:
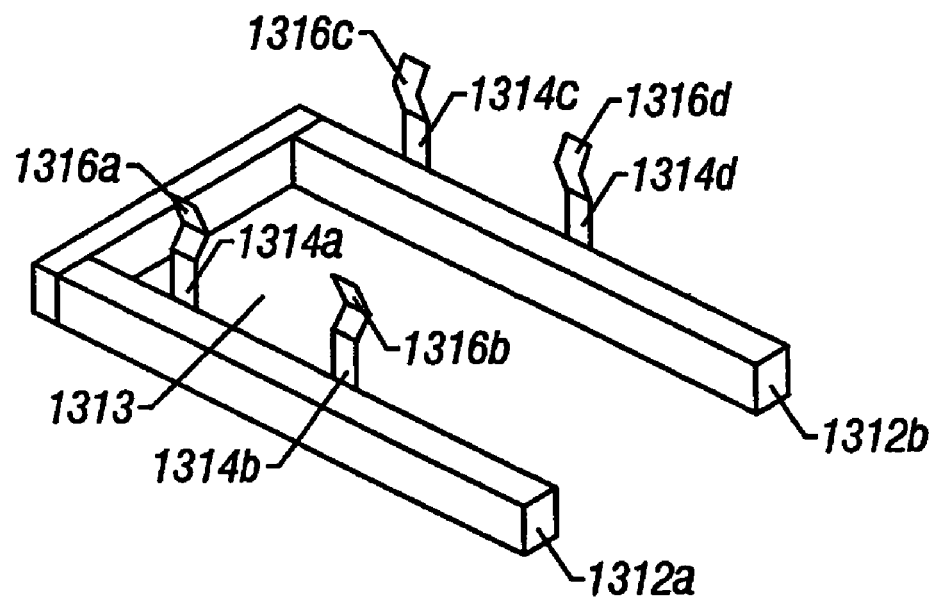
FIG. 13 is a partial perspective view of a portion of an optical arm with mounting prongs, according to an embodiment of the present invention.

In addition to provisions for thermal management and electronic coupling of the optics head 128 to the arm 142, embodiments of the present invention also include provisions for mechanical mounting or coupling of the optics head 128 with respect to the arm 142. In the embodiment depicted in FIG. 13, first and second arms 1312 *a, b* define a region 1313 for receiving an optics head. A plurality of flexible prongs 1314 *a,b,c,d* are coupled tho the arms. The prongs have angled protrusions 1316*a,b,c,d* configured to contact portions of the optics head when the head is in the region 1313. Once the optics head is positioned as desired (e.g. using mechanisms for gripping and moving the optics head), the protrusions can be fixed to portions of the optics head, e.g. using an adhesive, and preferably the prongs are stiffened or fixed, e.g. by coating with epoxy or other stiffening agent, possibly using an ultraviolet or other curing step.

Figure 14:
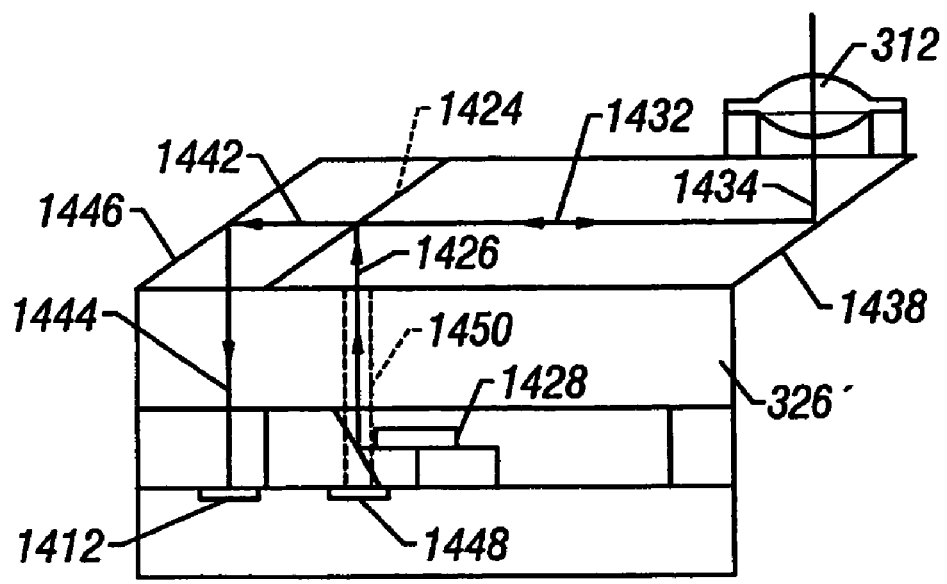
FIG. 14 is a longitudinal cross sectional view of an optical head according to an embodiment of the present invention.
Figure 15:
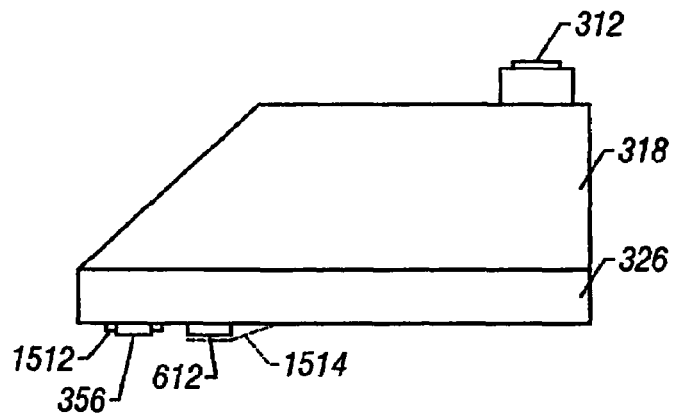
FIG. 15 is a side elevational view of components of an optical head with a laser mounted on a surface of the optical die, according to an embodiment of the present invention.

FIG. 14 depicts an embodiment of the invention in which the detector 1412 is positioned outwardly of the mirror block 332. In this embodiment the PBS 1424 is positioned and configured to substantially reflect the light 1426 received from the laser source 1428 to a horizontal path 1432. The light is then reflected to a vertical path 1434 toward the objective 312 by a reflective surface 1438. The reflected light returns along a similar path 1434, 1432, but, having a changed polarization, is transmitted through the PBS 1424 along a horizontal path 1442, to be reflected downward 1444 toward the detector 1412 by a reflective surface 1446. In one embodiment the undersurface of the optics block 326' in the region surrounding the path of the reflected beam 1444 is coated with an absorptive coating, such as non-reflective (black) chrome, to assist in protecting the detector 1412 from stray light. In one embodiment, an annular reflective coating is positioned on the lower surface of the optics block 326' surrounding the position of the central portion of the beam 1426 in order to reflect the outermost annular portion of the beam downward 1446 to a feedback detector 1448 for controlling laser power. Other regions can be coated with absorptive or reflective coatings for controlling stray light, as will be clear to those of skill in the art after understanding the present disclosure.

Figure 10:
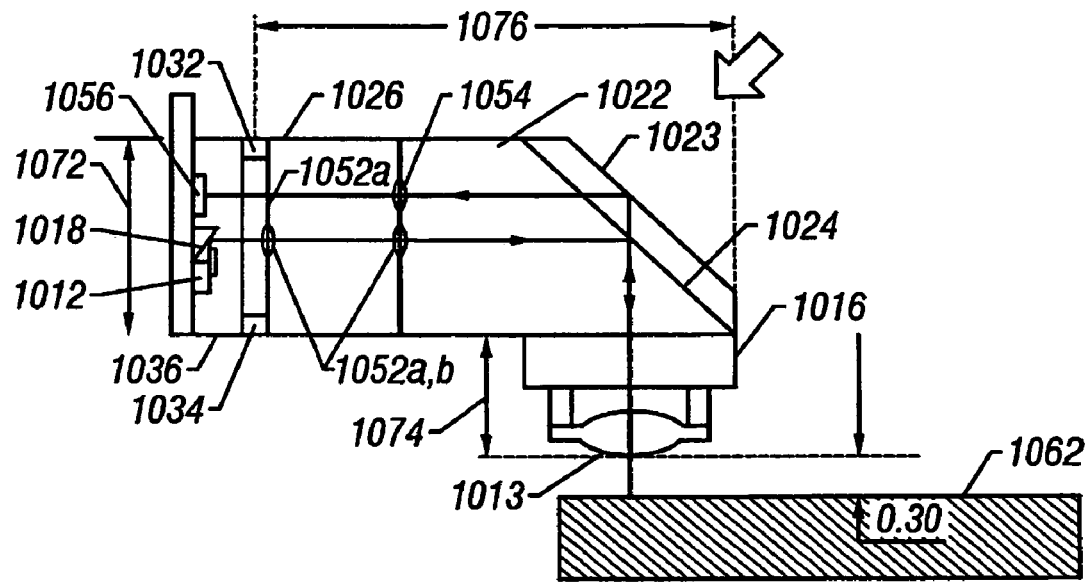
FIG. 10 is a vertical cross section through an optical head and a portion of an optical disk according one embodiment of the present invention.

Another embodiment of the invention is depicted in FIG. 10. While FIG. 10 shares some features with the embodiment of FIGS. 3–6, in FIG. 10 the silicon (or similar) sub-mount 1036 on which the laser 1012 and detector 1056 are mounted is positioned in a substantially vertical attitude, i.e. in a plane perpendicular to the surface or plane of the disk 1062. An optical die 1026 is mounted spaced from the sub-mount 1036 by spacers 1032, 1034 and the turning mirror 1018 is a separate structure. Light from the laser 1012 passes through beam-shaping optics 1052*ab* and into a mirror block 1022. The read/write beam is reflected by an interior PBS surface 1024, downward through a quarter wave plate 1016 and objective lens 1013 to the disk 1062. Reflected light, having its polarization altered, passes through the PBS 1024 and is reflected from a reflective surface 1023 through servo optics 1054 of the optics die 1026 to the photo detector 1056. Although a number of sizes and shapes of devices can be used in connection with the present invention, in one embodiment, the vertical height 1072 of the optics die 1026 and block 1022 is about 1.8 mm and the height 1074 of the quarter wave plate and mounted lens is about 1.02 mm. In one embodiment, the lateral dimension 1076 of the optics die 1026 and block 1022, about 4.0 mm.

Another embodiment of the present invention is depicted in FIG. 16. In the embodiment of FIG. 16, the laser 612 and the photodetector 356, rather than being mounted on a separate chip or submount, is mounted on the lower surface of the optical die 326. In the depicted embodiment, regions of the lower surface of the optical die 326 are selectively metalized or coated, e.g. to provide reflective or absorptive regions e.g. for surrounding the photodetector 1512 to control stray light, and/or to define regions for coupling the photodetector 356, laser 612 or other components or circuitry. In one embodiment one surface of the laser diode is used for coupling leads 1514 and the like to provide power, data or control signals to and from the laser 612. In one embodiment, the free surface of the laser 612 can be directly coupled to a heat sink (including, if desired some or all of the optical arm), for effective thermal management. The configuration of FIG. 16 can not only provide for effective thermal management, but, by avoiding the need for a silicon board 338 or submount 336, can reduce the vertical height requirements, further promoting the low-profile nature of the optical head.

In light of the above description, a number of advantages of the present invention can be seen. The present invention includes a recognition that a small spot size compatible with high data density (e.g. as facilitated by use of a first surface medium) makes it feasible to provide substantially all optical components in a small and/or lightweight package, e.g., such that tracking and/or focus can be performed by moving the entire optics package or head (as opposed to, e.g., moving just the objective lens). The present invention provides a device which is not only sufficiently small and lightweight to maintain all of the optics components in fixed positions with respect to one another, but also to provide these components with spatial extends in various directions, such as providing a small vertical (low profile) optical head so as to be compatible with the form factors of a type consistent with use in small and/or portable drives or host devices, e.g., personal electronic devices. The present invention can provide an optical head which is highly efficient such as by using an optical design which substantially avoids overfilling or otherwise spilling optical or other energy. The present invention provides a design in which some or all steps of fabrication can be performed in a relatively inexpensive fashion such as using techniques from wafer-scale fabrication technology and/or using a planar or stacking technique for assembling the optical head.

Figure 17:
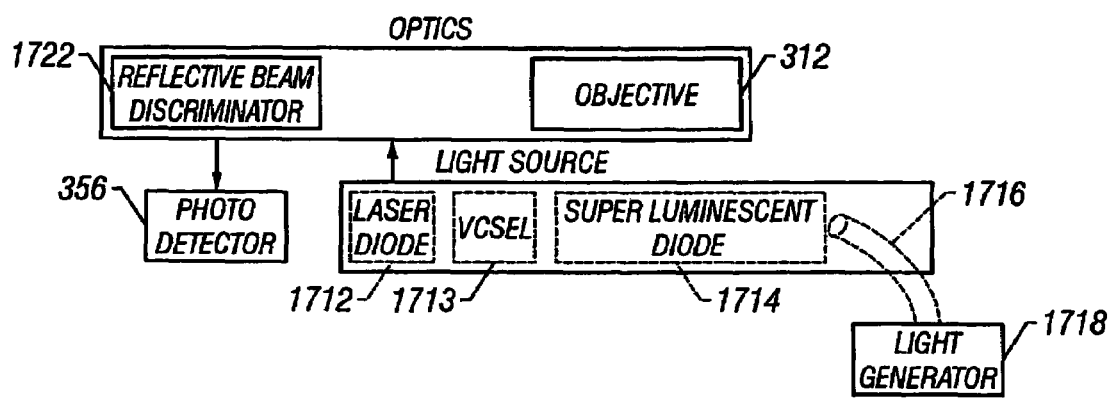
FIG. 17 is a block diagram depicting components that can be uses in providing various embodiments of the present invention.

A number of variations and modifications of the present invention can be used. It is possible to use some aspects of the invention without using others. For example, it is possible to provide an optical head which is sufficiently small and/or lightweight that it becomes feasible to move the entire optical head (e.g. for tracking and/or focus) without using the wafer-scale and/or stacking fabrication techniques described herein. In one embodiment, some or all of the optics depicted as being provided in, or on, a separate optics die 326 can be formed in or on the periscope or optical block 322, thus potentially making it possible to provide embodiments of the present invention do not require providing or assembling a separate optical die 326 (i.e. placing a combined prism/optics component directly on the spacers 322, 324). Although in embodiments depicted herein, a polarization beam splitter was used for discriminating emitted and reflected light, other techniques or devices for discriminating emitted and reflected light 1722 (FIG. 17) can be used including diffraction gratings, as will be understood by those of skill in the art after understanding the present disclosure. Although embodiments have been described in which a periscope application provides two changes of direction (vertical to horizontal and horizontal to vertical) (which can be of use in reducing the height profile, without unduly limiting optical path length). It is also possible to provide configurations in which multiple internal reflections between (typically parallel) surfaces (such as three or more) are used, e.g. for reducing an optical head profile. In some embodiments it may be preferable to configure the system such that the periscope prism (or other components of the stacked optical head) are substantially symmetric in configuration (e.g. to enhance manufacturability). Although embodiments have been described in which substantially all optics components of the optics head are fixed with respect to one another, it is also possible to provide operable configurations in which some components are movable. For example, it is possible to construct an operable device in which the objective lens is movable with respect to one or more components of the optics head, e.g. for fine (or coarse) focus, tracking or the like. Although embodiments have been described in which wafer-scale and/or stacking approaches are used, it is also possible to provide some or all optical components using integrated optics techniques, as will be understood by those of skill in the art after understanding the present invention. Although the optics head with a periscope sections and/or with substantially all components being relatively non-movable has been described in connection with a device in which tracking is provided by rotation of an optics arm about an axis parallel to the spin axis, it is also possible to configure a device in which an optics head substantially as described herein is moved in other fashions, such as providing rails or similar devices for achieving linear (e.g. radial) tracking motion of the optical head. Although embodiments are described herein which have a diode 1712 (FIG. 17) or other laser as a light source, it is possible to provide embodiments of the present invention which use non-laser light, such as providing a superluminescent diode 1714, an incandescent, flourescent, arc, vapor or other light source. It is possible to provide, as the light source which is in the optical head, a light delivery component, such as the output 1716 of a fiber optic or other light conveyance device, which delivers, in or to the optical head, light generated by a laser or other light generator 1718. Use of a fiber optic can assist in thermal management (e.g. by permitting a laser to be mounted remote from the optical head) and/or providing for circularizing a light beam.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An optical disk read/write drive apparatus comprising:
   an optical arm moveable with respect to optical media position in said drive; and an optical head coupled to said optical arm, said optical head including at least a light source and an objective wherein said light source and said objective are maintained in a substantially fixed spatial relationship during at least first movement of said optical art, and wherein the light source comprises at least one of a edge-emitting laser diode and a VCSEL.

2. Apparatus, as claimed in claim 1, wherein said first movement is tracking movement.

3. Apparatus, as claimed in claim 1, wherein said first movement is focusing movement.

4. A method for assembling components of an optical disk read/write drive, said drive defining an optical media position, the method comprising:
   mounting an optical arm so as to be moveable with respect to said optical media position in said drive; and
   coupling an optical head to said optical arm, said optical head including at least a light source and an objective wherein said light source and said objective are maintained in a substantially fixed spatial relationship during at least first movement of said optical arm, and wherein the light source comprises at least one of an edge-emitting laser diode and a VCSEL.

5. A method, as claimed in claim 4, wherein said first movement is tracking movement.

6. A method, as claimed in claim 4, wherein said first movement is focusing movement.

7. An optical disk read/write drive comprising:
   arm means for supporting optics, moveable with respect to an optical media position in said drive; and
   optics means, coupled to said arm means, for providing light from a light output means to said optical media position wherein said light output means and said optic means are maintained in a substantially fixed spatial relationship during at least first movement of said arm means, and wherein said light output means comprises at least one of an edge-emitting laser diode and a VCSEL.

8. Apparatus, as claimed in claim 7, wherein said first movement is tracking movement.

9. Apparatus, as claimed in claim 7, whereto said first movement is focusing movement.

10. An optical head for use in an optical medium reader/writer, the optical medium defining a plane, comprising:
a first silicon wafer chip having electronic components formed thereon; a light source mounted in a fixed position with respect to said chip; at least a first mirror, in a fixed position with respect to said chip, and positioned, with respect to said light source so as to receive light output by said light source and reflect said light, changing its direction;
an optics-carrying component mounted in a fixed position with respect to said light source wherein optics, carried by said optics-carrying component, to receive and modify at least a portion of said light reflected from said mirror; and
an objective mounted in a fixed position with respect to said optics-carrying component for focusing light on said medium wherein light from said light source travels along an initial optical path wherein said light is reflected by said first mirror to said optics-carrying-component, and travels along a path, including a first path, to said objective and travels at least to said medium.

11. An optical head, as claimed in claim 10, further comprising at least a first spacer mounted with respect to said chip.

12. An optical head, as claimed in claim 11, wherein said first mirror is integrally formed as a part of said first spacer.

13. Apparatus, as claimed in claim 10, wherein said light source comprises a laser.

14. Apparatus, as claimed in claim 10, wherein said light source comprises an edge-emitting laser diode.

15. Apparatus, as claimed in claim 10, wherein said light source comprises a VCSEL.

16. Apparatus, as claimed in claim 15, wherein said first path is substantially perpendicular to a spin axis of said medium.

17. Apparatus, as claimed in claim 15, wherein said first path is substantially parallel to a spin axis of said medium.

18. Apparatus, as claimed in claim 15, wherein said optical path has a substantially finite conjugate configuration, in the absence of collimization along said optical path between said light source and said objective.

19. Apparatus, as claimed in claim 10, wherein said light source comprises a fiber optic.

20. Apparatus, as claimed in claim 10, wherein said first path is substantially parallel to said plane defined by said medium.

21. Apparatus, as claimed in claim 10 wherein said optics-carrying component comprises an optics die and an adjacent periscope block.

22. Apparatus, as claimed in claim 10, wherein the total vertical distance from said light source to the plane of said medium is less than about 5 mm.

23. Apparatus, as claimed in claim 10, further comprising a photodetector mounted in a fixed position with respect to said chip.

24. Apparatus as claimed in claim 23 wherein said photodetector is a segmented photodetector.

25. Apparatus, as claimed in claim 23, wherein said optics-carrying component comprises at least a first optic for receiving reflected light from said media along a second path and providing at least some reflected light to said photodetector.

26. Apparatus, as claimed in claim 25, wherein said second path is substantially parallel to a spin axis for said medium.

27. Apparatus, as claimed in claim 26, wherein said optics-carrying component comprises a periscope block, said periscope block having a first reflective surface for receiving light along said second path and reflecting said light along a third path, said third path being substantially parallel to the plane of said medium.

28. Apparatus, as claimed in claim 27, wherein said periscope block further comprises at least a first means, positioned along said initial optical path, for reflecting at least some light from said third path to a fourth path substantially parallel to a spin axis of said medium, and wherein said first means substantially discriminates light reflected from said medium.

29. Apparatus, as claimed in claim 28, wherein said first means comprises a polarization beam splitter.

30. Apparatus as claimed in claim 28, wherein said first means discriminates by substantially transmitting light reflected from said medium and substantially reflects at least some other light.

31. Apparatus, as claimed in claim 28, wherein said first means discriminates by substantially reflecting light reflected from said medium and substantially transmitting at least some other light.

32. Apparatus, as claimed in claim 28, further comprising at least a first quarter wave plate positioned, along said optical path, substantially between said polarization beam splitter and said objective.

33. Apparatus, as claimed in claim 10, wherein said optics-carrying component carries at least a first optic for discriminating between emitted light and reflected light.

34. A method for use in an optical medium reader/writer, the optical medium defining a plane, comprising:
forming electronic components on a first silicon wafer chip;
mounting a light source in a fixed position with respect to said chip;
positioning at least a first mirror in a fixed position with respect to said chip and with respect to said light source so as to receive laser light output by said laser diode and reflect said light, changing its direction;
mounting an optics-carrying component in a fixed position with respect to said spacer wherein optics, carried by said optics-carrying component, receive and modify at least a portion of said light reflected from said mirror; and
mounting an objective in a fixed position with respect to said optics-carrying component for focusing light on said medium wherein an initial optical path is defined for said laser light, said initial optical path extending from said light source to said first mirror, to said optics-carrying-component, to said objective and at least to said medium, a portion of said initial optical path from said optics-carrying component to said objective including a first optical path.

35. A method, as claimed in claim 34, further comprising mounting a photodetector in a fixed position with respect to said chip.

36. A method, as claimed in claim 34, wherein light is reflected from said medium and travels along a reflected light path, including at least a second light path substantially parallel to a spin axis of said medium, further comprising using said optics-carrying component for positioning at least a portion of said initial light path along a path different from said reflected light path.

37. A method, as claimed in claim 34, wherein said optics-carrying component comprises a periscope block, said periscope block having a first reflective surface for receiving light along said second path and reflecting said light along a third path, said third path being substantially parallel to the plane of said medium.

38. A method, as claimed in claim 37, further comprising positioning a polarization beam splitter with respect to said periscope block positioned along said optical path for reflecting light from said third path to a fourth path substantially parallel to a spin axis of said medium, and wherein said polarization beam splitter substantially transmits light reflected from said medium.

39. A method, as claimed in claim 38, further comprising positioning at least a first quarter wave plate along said initial optical path, substantially between said polarization beam splitter and said objective.

40. An optical head apparatus for use in an optical medium reader/writer, the optical medium defining a plane, comprising:
   a first substrate having electronic components positioned thereon; a light output means mounted in a fixed position with respect to said substrate; at least a first mirror means, in a fixed position with respect to said substrate, and positioned, with respect to said light output means so as to receive light output by said light output means and reflect said light, changing its direction;
   optics-carrying means mounted in a fixed position with respect to said light output means wherein optics, carded by said optics-carrying means, receives and modifies at least a portion of said light reflected from said mirror means; and
   objective means mounted in a fixed position with respect to said optics-carrying means for focusing light on said medium, wherein at least an initial optical path is defined for said light, said initial optical path extending from said light output means to said first mirror means, to said optics-carrying-means, to said objective means and at least to said medium.

41. Apparatus, as claimed in claim 40, further comprising at least first spacer means mounted with respect to said substrate.

42. Apparatus, as claimed in claim 40, wherein said optics-carrying means comprises said substrate.

43. Apparatus, as claimed in claim 40, further comprising a photodetector means mounted in a fixed position with respect to said substrate.

44. Apparatus, as claimed in claim 43, further comprising for receiving light reflected from said medium along a second path and providing at least some reflected light to said photodetector means.

45. Apparatus, as claimed in claim 40, further comprising means for discriminating between emitted light and reflected light.

46. Apparatus, as claimed in claim 45 further comprising a flexible circuit board means and wherein circuitry on said substrate is coupled to circuitry on said flexible circuit board means.

47. Apparatus, as claimed in claim 46, wherein said substrate has a major surface lying in a first plane and wherein a first portion of said flexible circuit board means is substantially parallel to said first plane and at least a second portion of said flexible circuit board means is not parallel to said first plane.

48. Apparatus, as claimed in claim 46 wherein said substrate is at least partially positioned in a cutout region formed in said flexible circuit board means.

49. Apparatus, as claimed in claim 46 wherein said flexible circuit board means includes at least a first thermally conductive coating in thermal communication with at least a portion of said substrate.

50. Apparatus, as claimed in claim 40, further comprising means for receiving light along said second path and reflecting said light along a third path, said third path being substantially parallel to the plane of said medium.

51. Apparatus, as claimed in claim 40, further comprising means for reflecting light from said third path to a fourth path substantially parallel to a spin axis of said medium.

52. Apparatus, as claimed in claim 40 wherein said substrate is selected from among the group consisting of a silicon wafer chip and a flexible circuit substrate.

53. Apparatus, as claimed in claim 52 wherein said flexible circuit substrate comprises a polyimide.

54. Apparatus, as claimed in claim 40 wherein said light output means is selected from among the group consisting of an edge-emitting laser diode and a VCSEL.

55. A method for fabricating an optical head comprising:
   forming a plurality of electronic circuits on a silicon wafer having at least a first surface defining a plane;
   mounting a plurality of light sources on said silicon wafer, with at least a first light source positioned adjacent at least some of said electronics circuits;
   positioning a plurality of spacer bars, each bar having a longitudinal axis, each bar defining a plurality of mirror surfaces with said mirror surfaces at about 45 o to said plane of said wafer surface;
   cutting said wafer along a plurality of cut lines to provide a plurality of wafer chips, at least some of said wafer chips having a light source mounted thereon and a portion of at least one of said spacer bars mounted thereon, wherein at least some of said cut lines intersects at least some of said spacer bars;
   providing power and control signals to said first light source wherein said first light source is caused to emit light; and
   positioning at least a first optical component with respect to said light source of at least a first chip during a time when said light source on said chip is emitting light.

56. A method as claimed in claim 55 wherein said first optical component is an optics-carrying component having a plurality of optics formed therein and wherein said step of positioning comprises moving said first optical component until said light is substantially centered on at least one of said optics.

57. A method as claimed in claim 55 wherein said optical head includes at least one photodetector, and wherein said first optical component is a periscope block, defining a reflected light exit path and wherein said step of positioning comprises moving said first optical component until said exit path defines a predetermined relationship with said photodetector.

58. A method as claimed in claim 55 wherein an objective is mounted on said first optical component during said step of positioning.

* * * * *